(12) United States Patent
Watanabe

(10) Patent No.: US 8,699,879 B2
(45) Date of Patent: Apr. 15, 2014

(54) OPTICAL PACKET SWITCHING APPARATUS

(75) Inventor: Kenji Watanabe, Kawasaki (JP)

(73) Assignee: Fujitsu Telecom Networks Limited, Kawasaki-shi (JP)

( * ) Notice: Subject to any disclaimer, the term of this patent is extended or adjusted under 35 U.S.C. 154(b) by 579 days.

(21) Appl. No.: 13/041,334

(22) Filed: Mar. 4, 2011

(65) Prior Publication Data

US 2012/0099859 A1    Apr. 26, 2012

(30) Foreign Application Priority Data

Oct. 25, 2010  (JP) ................................. 2010-238528

(51) Int. Cl.
*H04J 14/00*    (2006.01)

(52) U.S. Cl.
USPC .................................. 398/51; 398/45; 398/54

(58) Field of Classification Search
CPC .......... H04Q 11/0005; H04Q 11/0066; H04Q 11/0071; H04Q 11/0062; H04Q 2011/002; H04Q 2011/0039; H04Q 2011/0024; H04Q 2011/0045; H04Q 2011/0073; H04Q 2011/0077; H04J 3/0605
USPC ......... 398/45, 51, 54, 56, 57, 55, 50, 49, 154, 398/155
See application file for complete search history.

(56) References Cited

U.S. PATENT DOCUMENTS

| | | | | |
|---|---|---|---|---|
| 5,905,587 | A * | 5/1999 | Maeno et al. | 398/45 |
| 6,714,552 | B1 * | 3/2004 | Cotter | 370/406 |
| 7,242,867 | B1 * | 7/2007 | Clouinard | 398/52 |
| 7,764,882 | B2 * | 7/2010 | Beacken | 398/49 |
| 7,835,649 | B2 * | 11/2010 | Epps et al. | 398/155 |
| 8,542,996 | B2 * | 9/2013 | Kawasaki et al. | 398/54 |
| 2008/0080870 | A1 * | 4/2008 | Tsuji | 398/155 |

FOREIGN PATENT DOCUMENTS

| | | |
|---|---|---|
| JP | 04-347931 A | 12/1992 |
| JP | 2008-235986 | 10/2008 |

OTHER PUBLICATIONS

Notification of Reason(s) for Refusal for Japanese application No. 2010-238528 issued by the Japanese Patent Office on Jan. 21, 2014 with English Translation, 5 pages.

* cited by examiner

*Primary Examiner* — M. R. Sedighian
(74) *Attorney, Agent, or Firm* — Christie, Parker & Hale, LLP

(57) ABSTRACT

An optical packet switching apparatus includes an optical switch unit for switching the route of a received optical packet signal and output the received optical packet signal, and an optical switch control unit for extracting destination information from the received optical packet and generating a control signal for the optical switch unit according to the destination information. The optical switch control unit includes a clock generator for generating a plurality of local clocks of different phases, and a clock selector for selecting a local clock having the smallest phase difference with the received optical packet from the plurality of local clocks. The optical switch control unit generates the control signal using the local clock selected by the clock selector as an operation clock.

4 Claims, 8 Drawing Sheets

OPTICAL PACKET SWITCHING APPARATUS

CROSS-REFERENCE TO RELATED APPLICATION

This application claims priority to and the benefit of Japanese Patent Application Number 2010-238528, filed on Oct. 25, 2010.

BACKGROUND OF THE INVENTION

1. Field of the Invention

The present invention relates to an optical packet switching apparatus for sending out received optical packets by switching the path for the destination of the optical packet.

2. Description of the Related Art

In the switching (routing) of optical packet signals such as 1 GEther (1 Gigabit Ethernet (registered trademark)) and 10 GEther (10 Gigabit Ethernet), the conventional method has been such that the optical packet signals are once converted to electrical signals before the switching is done by the use of an electric memory. However, in recent years, the IP (Internet protocol) traffic has been increasing at an accelerated pace with the increased distributions of the Internet, image signals, and the like. As a result, the required switching capacity is also increasing, and it is considered from the viewpoint of device scale and power consumption that the packet switching via electric memory will come to its limit in the near future.

Under these circumstances, optical packet switching apparatuses that send out inputted optical packets directly as optical signals without being converted into electrical signals are proposed in recent years (See Reference (1) in the following Related Art List, for instance).

RELATED ART LIST (1) Japanese Unexamined Patent Application Publication No. 2008-235986.

With an optical packet switching apparatus, the interval between optical packets (hereinafter referred to as "guard time" also) can be shortened and the efficiency of the transmission can be path raised, if the optical switch can be turned on when the first bit of the received packet passes and turned off when the last bit passes.

In reality, however, it is difficult to perform the above-mentioned switch control because the received optical packet and a local clock inside the optical packet switching apparatus are out of synchronization with each other. Therefore, turning on and off of the optical switch is done by providing a timing margin before and after the optical packet length. It is thus desirable that the timing margin be as short as possible if the efficiency of the transmission path is to be raised.

SUMMARY OF THE INVENTION

The present invention has been made in view of the foregoing circumstances, and a purpose thereof is to provide an optical packet switching apparatus capable of raising the efficiency of the transmission path.

In order to resolve the above-described problems, an optical packet switching apparatus according to one embodiment of the preset invention comprises: an optical switch unit configured to switch a path of a received optical packet signal and output the received optical packet signal; and an optical switch control unit configured to extract destination information from the received optical packet and configured to generate a control signal for the optical switch unit according to the destination information. The optical switch control unit includes a clock generator for generating a plurality of local clocks of different phases, and a clock selector for selecting a local clock having the smallest phase difference with the received optical packet from the plurality of local clocks; the optical switch control unit generates the control signal using the local clock selected by the clock selector as an operation clock.

The optical switch control unit may include a frame synchronization unit for synchronizing frames of optical packet signals using the local clock selected by the clock selector as operation clock.

The optical switch control unit may further includes a clock transfer unit for performing a transfer from a clock of the received optical packet signal to the local clock selected by the clock selector.

The optical switch control unit may further include an optical packet timing detector for generating an optical packet timing detection pulse that serves as a phase reference of the received optical packet signal, and the clock selector may select a local clock having the smallest phase difference with the optical packet timing detection pulse.

Optional combinations of the aforementioned constituting elements, and implementations of the invention in the form of apparatuses, methods, systems, programs, recording media storing the programs and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

Hereinbelow, an optical packet switching apparatus according to a preferred embodiment of the present invention is explained referring to drawings. The optical packet switching apparatus according to this embodiment enables route switching for each of optical packets. The route switching done for each optical packet improves the bandwidth usage efficiency of the transmission path. Firstly, before explaining the optical packet switching apparatus according to the present embodiment, a description is given of a known optical packet switching apparatus which the inventor has examined as a comparative example.

Figure 1:
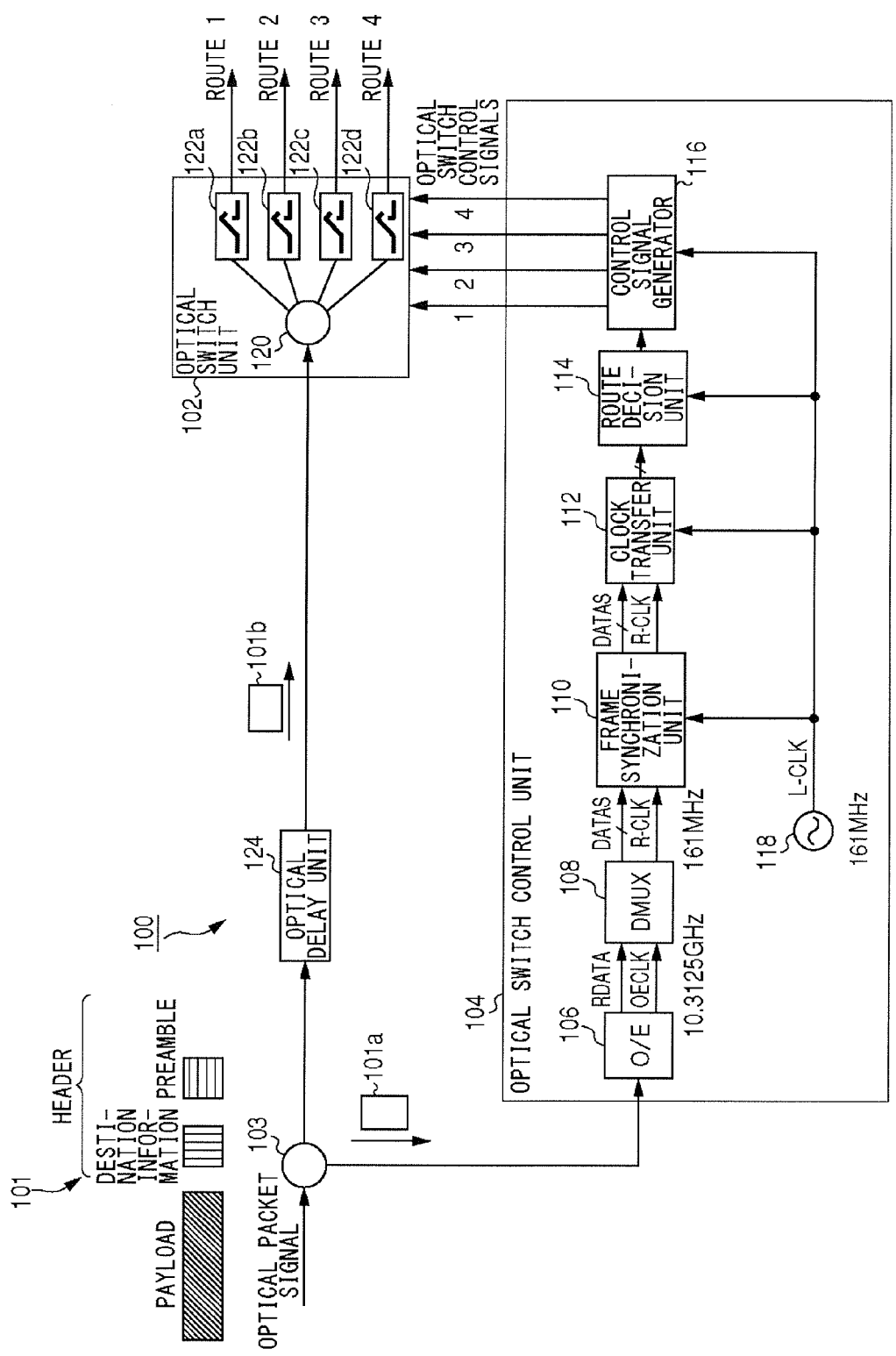
FIG. 1 is a diagram for explaining an optical packet switching apparatus which is depicted as a comparative example.

FIG. 1 is a diagram for explaining an optical packet switching apparatus 100 which is depicted as a comparative example. As shown in FIG. 1, the optical packet switching apparatus 100 according to the comparative example includes an optical switch unit 102 and an optical switch control unit 104. An optical packet signal 101 inputted to the optical packet switching apparatus 100 via a transmission path is bifurcated into two signals by an optical coupler 103. An optical packet signal 101a, which is one of the bifurcated signals, is inputted to the optical switch control unit 104, whereas an optical packet signal 101b, which is the other of the bifurcated signals, is inputted to the optical switch unit 102.

An optical packet signal 101, as shown in FIG. 1, is comprised of a payload, which is transmitted data, and a header, which is set before the payload. The header includes a preamble, which is used to stabilize an optical receiver receiving the optical packet signal, and destination information for the optical packet. Note that in the description of this comparative example, the optical packet signal to be inputted is assumed to be an optical packet signal of 10 GEther (10.3125 Gbps).

The optical switch control unit 104 references the destination information in the optical packet signal 101a and outputs a control signal to control the optical switch unit 102. As shown in FIG. 1, the optical switch control unit 104 includes an optical-to-electrical (O/E) converter 106, a DMUX unit 108, a frame synchronization unit 110, a clock transfer unit 112, a route decision unit 114, a control signal generator 116, and a local oscillator 118.

The O/E converter 106 performs predetermined processes, such as photoelectric conversion, amplification, clock extraction, identification and reproduction, on a received optical packet signal 101a and then outputs a data signal RDATA and a clock signal OECLK to the DMUX unit 108. The frequency of the clock signal OECLK is 10.3125 GHz.

The DMUX unit 108 performs a serial/parallel conversion of the data signal RDATA and the clock signal OECLK. This serial/parallel conversion is performed in order to reduce the load on an electrical circuit by lowering the signal speed. The DMUX unit 108 herein performs a serial/parallel conversion of 1:64. Accordingly, the frequency of the post-conversion clock signal R-CLK is 161 MHz.

A parallel data signal DATAS and a clock signal R-CLK outputted from the DMUX unit 108 are inputted to a frame synchronization unit 110. The frame synchronization unit 110 accomplishes frame synchronization of the optical packet signal by detecting a predetermined synchronization code contained in the header. The frame synchronization unit 110 establishes the frame synchronization using a local clock L-CLK of 161 MHz, which is supplied from the local oscillator 118, as an operation clock.

The parallel data signal DATAS and clock signal R-CLK whose frame synchronization is established are inputted to the clock transfer unit 112. The clock transfer unit 112 performs a transfer from the clock R-CLK extracted from the optical packet signal 101a to a local clock L-CLK outputted by the local oscillator 118. Clock extraction from the optical packet signal 101a can be done only during the receiving of the optical packet, so that it is not easy to have the electric circuit operate reliably. Therefore, the local oscillator 118 is provided to enable a transfer of the clock signal, thereby ensuring a reliable operation of the electric circuit.

A parallel data signal outputted from the clock transfer unit 112 is inputted to the route decision unit 114. The route decision unit 114 extracts destination information from the received parallel data signal, and makes a route decision for controlling a desired optical switch in the optical switch unit 102.

The control signal generator 116 generates optical switch control signals for controlling the optical switch unit 102 based on the result of route decision by the route decision unit 114. In the present comparative example, the optical switch unit 102 has four optical switches, so that the control signal generator 116 generates four optical switch control signals 1 to 4 and outputs them to the optical switch unit 102. Optical switch control signals may be generated, for instance, by storing optical switch control patterns in ROM in advance and reading out a control pattern corresponding to the result of route decision.

On the other hand, the optical packet signal 101b, which is the other of the bifurcated signals, is inputted to the optical switch unit 102 via an optical delay unit 124. If the optical packet signal 101b, which is branched off by the optical coupler 103, is inputted directly to the optical switch unit 102, the optical switch control signal outputted from the optical switch control unit 104 will have a delay in relation to the optical packet signal 101b. Thus, the optical delay unit 124 is placed between the optical coupler 103 and the optical switch unit 102 to eliminate the delay time of the optical switch control signal in relation to the optical packet signal 101b. The optical delay unit 124 can be implemented, for instance, by adjusting the optical fiber length.

The optical switch unit 102 is a 1×4 optical switch which has an optical coupler 120 for branching the inputted optical packet signal 101b off into four optical packet signals and four optical switches 122a to 122d for receiving the branched-off optical packet signals. The optical switches 122a to 122d may be implemented as ones employing a semiconductor optical amplifier (SOA) or an LN intensity modulator, for instance. The on/off of the optical switches 122a to 122d is controlled by the optical switch control signals 1 to 4. For example, when the optical packet signal 101b is to be outputted to route 1, the optical switch 122a is turned on, and the other optical switches 122b to 122d are turned off. As a result, the optical packet signal 101b is outputted to route 1, passing through the optical switch 122a only.

Figure 2:
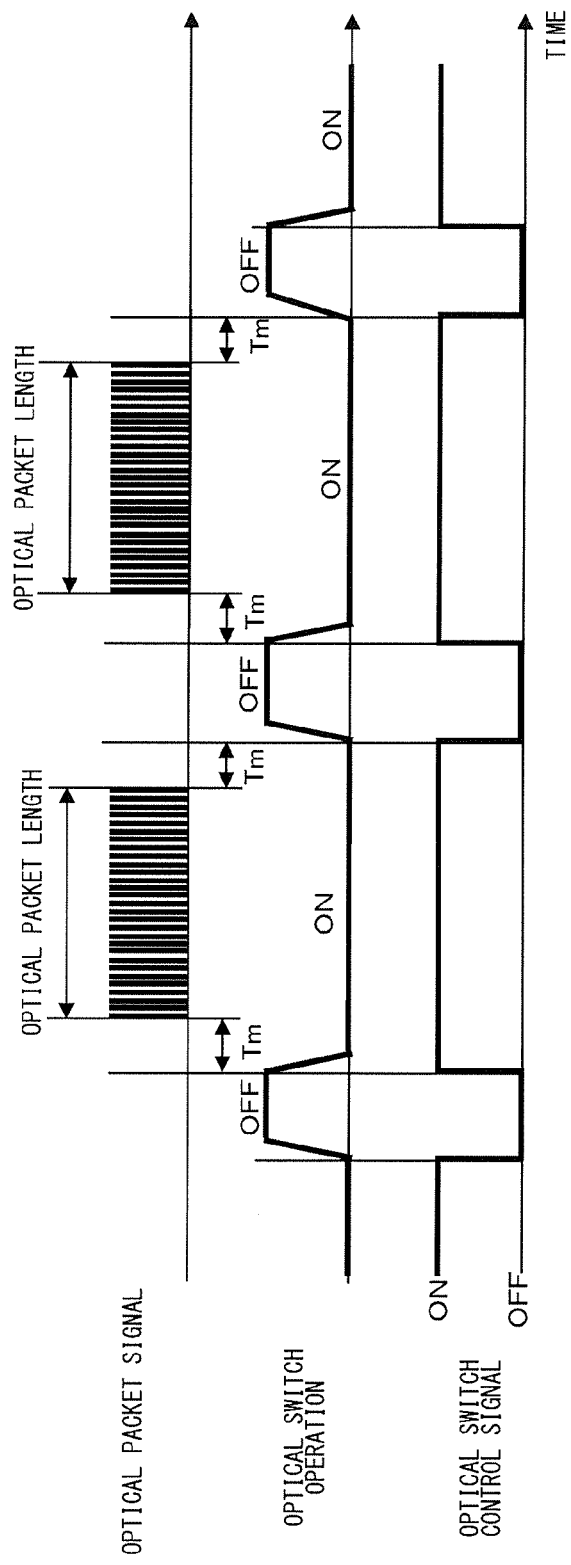
FIG. 2 shows an operation timing chart of an optical packet switching apparatus.

FIG. 2 shows an operation timing chart of the optical packet switching apparatus. FIG. 2 is a timing chart of the optical packet signal, the operation of the optical switch, and the optical switch control signal. As shown in FIG. 2, the optical switch is controlled such that the on-time is longer than the actual optical packet length. The timing margin provided before and after the optical packet length is called a timing margin Tm. The reason why the timing margin Tm is provided before and after the optical packet length is explained below.

Figure 3A:
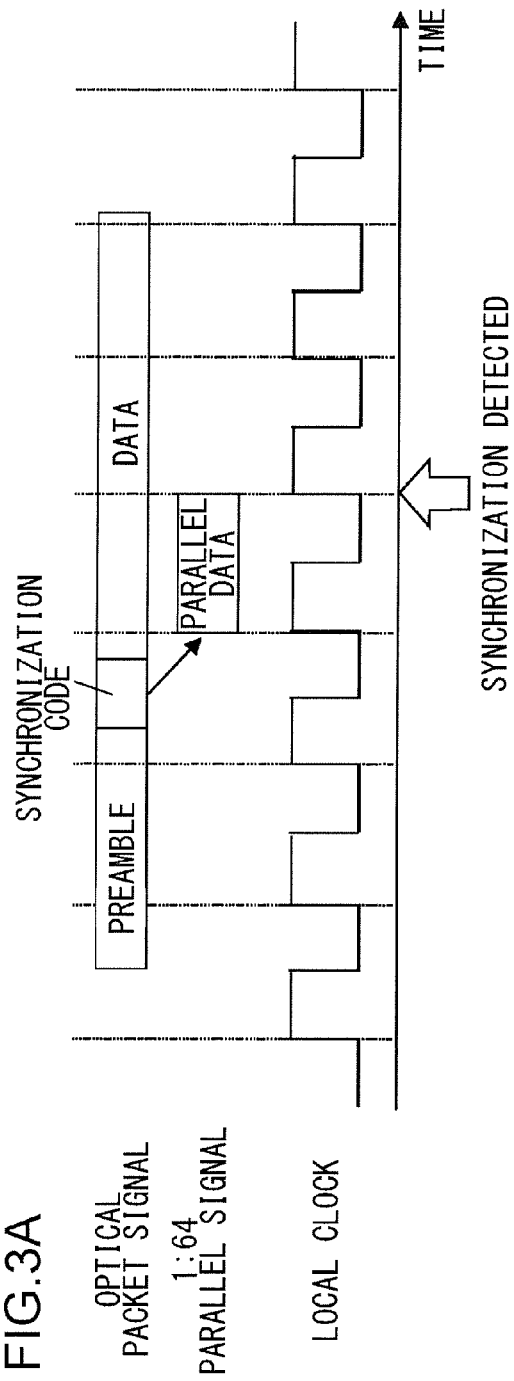
FIGS. 3A and 3B are diagrams for explaining variation in frame synchronization detection timing.
Figure 3B:
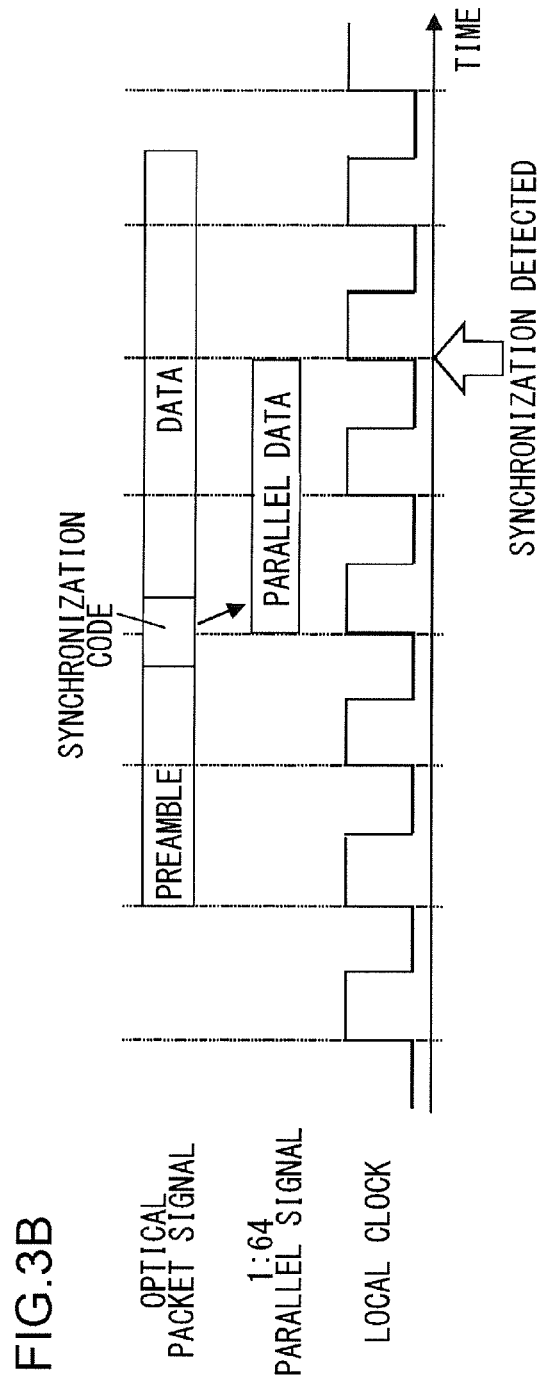

FIGS. 3A and 3B are diagrams for explaining variation in frame synchronization detection timing (timing variation). FIG. 3A shows an example of phase relationship between an optical packet signal and a local clock, whereas FIG. 3B shows another example of phase relationship between an optical packet signal and a local clock. As mentioned previously, the frame synchronization unit 110 accomplishes synchronization of an optical packet signal by detecting a synchronization code contained in the header thereof. However, since the optical packet signal and the local clock are asynchronous with each other, the phase relationship between them is not constant. Accordingly, depending on the phase relationship of the local clock to the optical packet signal, there may be cases, as shown in FIG. 3A, where the synchronization code of the optical packet signal is parallel data in phase with the clock, and cases as shown in FIG. 3B, where the synchronization code of the optical packet signal is parallel data lying over two clock pulses. As a result, depending on the phase relationship of the local clock to the optical packet signal, there occurs a variation equivalent to one clock pulse, or 6.2 ns, in the timing of detection of frame synchronization.

Figure 4A:
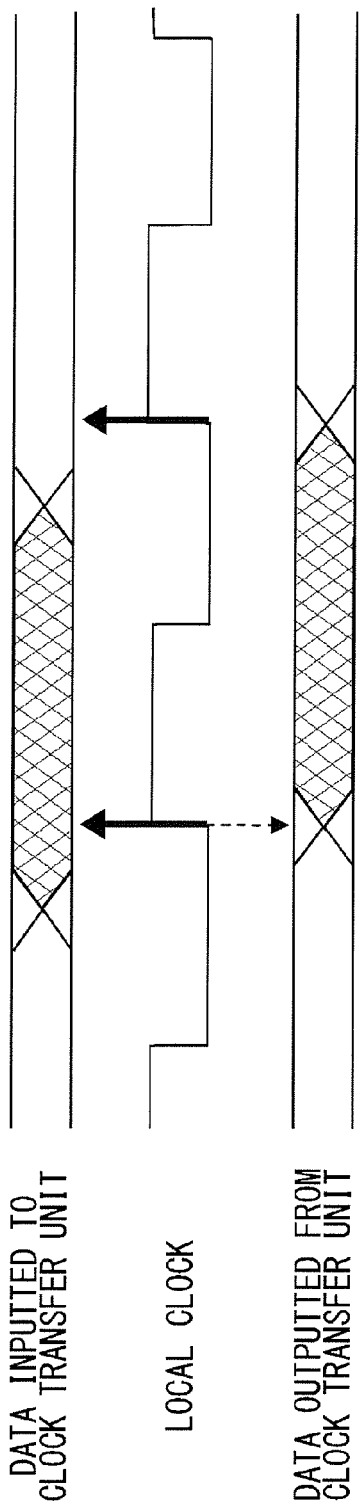
FIGS. 4A and 4B are diagrams for explaining variation in clock transfer timing.
Figure 4B:
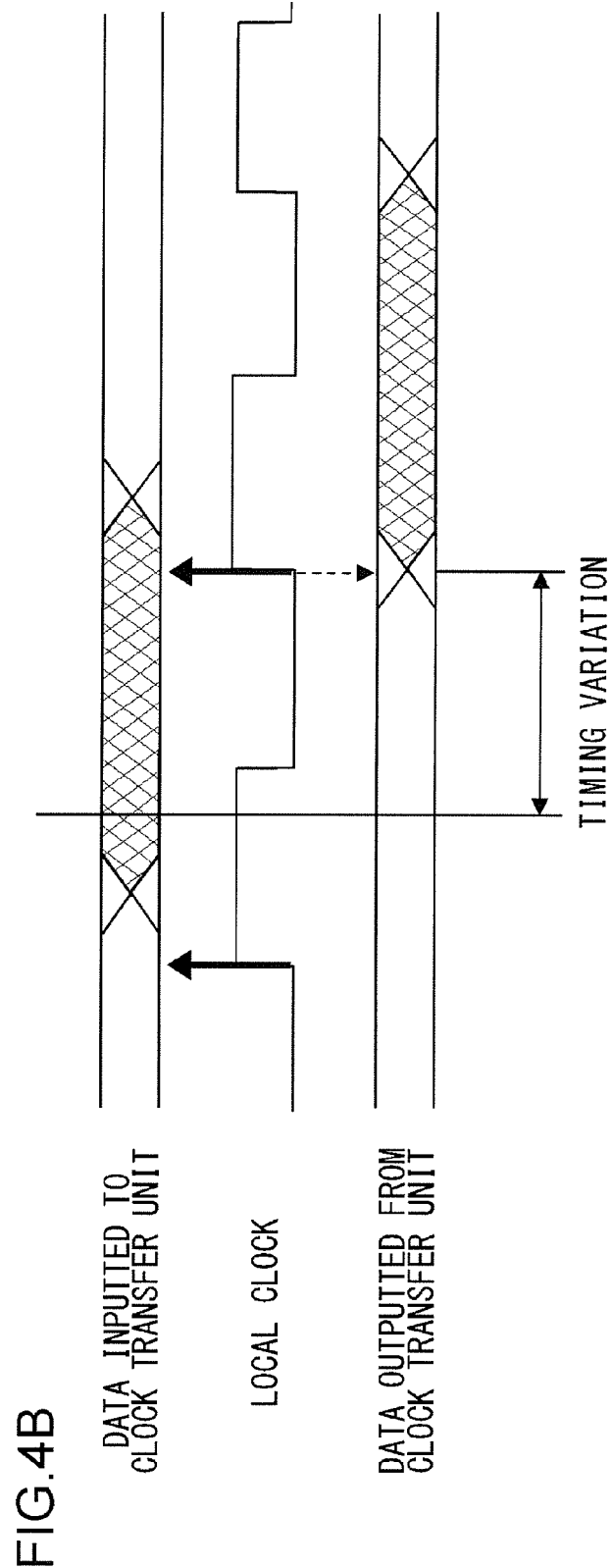

FIGS. 4A and 4B are diagrams for explaining variation in clock transfer timing (timing variation). FIG. 4A shows an example of phase relationship between a parallel data signal inputted to the clock transfer unit 112 and a local clock, whereas FIG. 4B shows another example of phase relationship between a parallel data signal inputted to the clock transfer unit 112 and a local clock. As shown in FIGS. 4A and 4B, the clock transfer unit 112 outputs data by performing a transfer of clock at a rising edge of the local clock. It is to be noted here that the inputted parallel data signal and the local clock are asynchronous with each other, so that the phase relationship between them is not constant. Accordingly, depending on the phase relationship of the local clock to the inputted parallel data signal, there occurs a variation equivalent to a maximum of one clock pulse, or 6.2 ns, in clock transfer timing.

As is evident from FIGS. 3A and 3B and FIGS. 4A and 4B, the switch control signals are subject to the possibility of a total timing variation of 12.4 ns, which are 6.2 ns at the frame synchronization unit 110 and 6.2 ns at the clock transfer unit 112. Hence, the optical packet switching apparatus 100 according to the comparative example is provided with a timing margin Tm before and after the optical packet length in order to accommodate the timing variation.

However, the longer the timing margin Tm is, the longer the guard time between optical packet signals will also be, thus causing a drop in the efficiency of the transmission path. Therefore, it is desirable that the timing margin Tm be as short as practicable. Focusing the inventor's attention to the problems as described above, the inventor has made the present invention through close and diligent investigations. Hereinbelow, an optical packet switching apparatus according to a preferred embodiment of the invention will be explained.

Firstly, a description is given of an outline of an optical packet switching apparatus according to the preferred embodiment of the present invention. The problems as described above are attributable to the absence of synchronization between the optical packet signal and the local clock. Therefore, an ultimate method of solving these problems is to actually synchronize the clock R-CLK extracted from the optical packet signal and the local clock L-CLK with each other. However, it is not easy to synchronize them if the optical packet generating station generating the optical packet signal is far apart from the optical packet switching apparatus. Moreover, optical packet signals may arrive at the optical packet switching apparatus from a large number of optical packet generating stations, and these optical packet signals are asynchronous with each other. Therefore, the present invention employs a simple method of synchronizing optical packet signals with a local clock. That is, a plurality of local clocks of different phases is prepared in advance, and a local clock having the phase closest to the phase of the received optical packet signal is selected. As a result, the timing variations of switch control signals at the frame synchronization unit and the clock transfer unit as described above can be made smaller.

Figure 5:
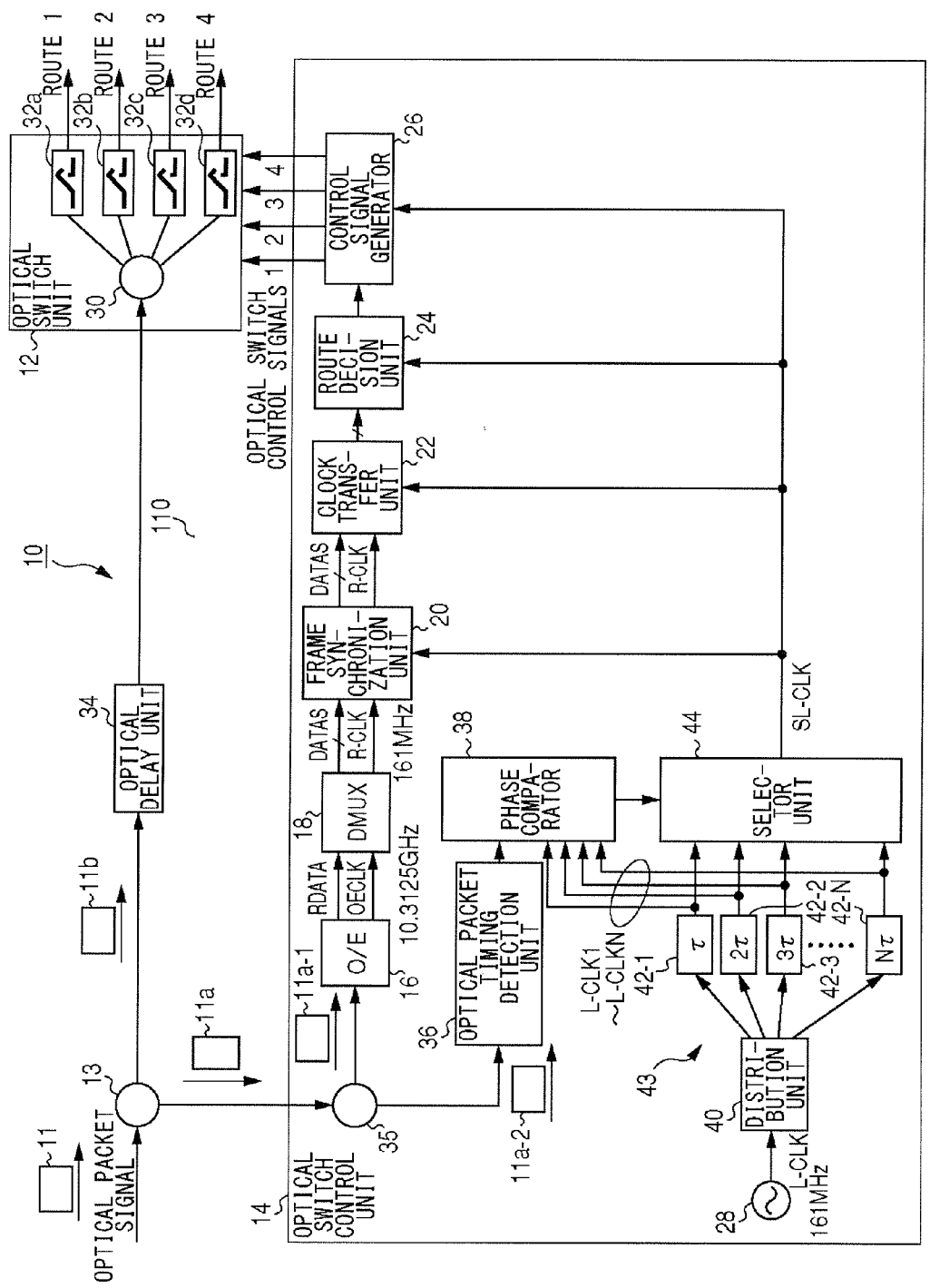
FIG. 5 is a diagram for explaining an optical packet switching apparatus according to an embodiment of the present invention.

FIG. 5 is a diagram for explaining an optical packet switching apparatus 10 according to the preferred embodiment of the present invention. As shown in FIG. 5, the optical packet switching apparatus 10 includes an optical switch unit 12, which outputs a received optical packet signal by effecting a path switching therefor, and an optical switch control unit 14, which controls the optical switch unit 12. An optical packet signal 11 inputted to the optical packet switching apparatus 10 via an optical fiber transmission path or the like is bifurcated into two signals by an optical coupler 13. An optical packet signal 11a, which is one of the bifurcated signals, is inputted to the optical switch control unit 14, whereas an optical packet signal 11b, which is the other of the bifurcated signals, is inputted to the optical switch unit 12. Note that in the description of this embodiment, too, the optical packet signal to be inputted is assumed to be an optical packet signal of 10 GEther (10.3125 Gbps). The repeated description of components identical or similar to those of the comparative example shown in FIG. 1 will be omitted as appropriate.

The optical switch control unit 14 references the destination information in the optical packet signal 11a and outputs optical switch control signals to control the optical switch unit 12. As shown in FIG. 5, the optical switch control unit 14 includes an optical-to-electrical (O/E) converter 16, a DMUX unit 18, a frame synchronization unit 20, a clock transfer unit 22, a route decision unit 24, a control signal generator 26, a local oscillator 28, an optical coupler 35, an optical packet timing detection unit 36, a phase comparator 38, a distribution unit 40, clock delay units 42, and a selector unit 44.

An optical packet signal 11a inputted to the optical switch control unit 14 is bifurcated into two signals by the optical coupler 35. An optical packet signal 11a-1, which is one of the bifurcated signals, is inputted to the O/E converter 16. The O/E converter 16 performs predetermined processes, such as photoelectric conversion, amplification, clock extraction, identification and reproduction, on the received optical packet signal 11a-1 and then outputs a data signal RDATA and a clock signal OECLK to the DMUX unit 18. The frequency of the clock signal OECLK is 10.3125 GHz.

The DMUX unit 18 performs a serial/parallel conversion of the data signal RDATA and the clock signal OECLK. The DMUX unit 18 herein performs a serial/parallel conversion of 1:64. Accordingly, the frequency of the post-conversion clock signal R-CLK is 161 MHz.

The parallel data signal DATAS and clock signal R-CLK outputted from the DMUX unit 18 are inputted to the frame synchronization unit 20. The frame synchronization unit 20 accomplishes frame synchronization of the optical packet signal by detecting a predetermined synchronization code contained in the header. The frame synchronization unit 20 establishes the frame synchronization using a selected local clock SL-CLK supplied from the selector unit 44 as the operation clock. The selected local clock SL-CLK will be described later.

The parallel data signal DATAS and clock signal R-CLK whose frame synchronization is established are inputted to the clock transfer unit 22. The clock transfer unit 22 performs a transfer from the clock R-CLK, extracted from the optical packet signal 11a-1, to the selected local clock SL-CLK outputted by the selector unit 44.

The parallel data signal outputted from the clock transfer unit 22 is inputted to the route decision unit 24. The route decision unit 24 extracts the destination information from the received parallel data signal, and makes a route decision for controlling a desired optical switch in the optical switch unit 12.

The control signal generator 26 generates optical switch control signals for controlling the optical switch unit 12 based on the result of route decision by the route decision unit 24. In the present embodiment, too, the optical switch unit 12 has four optical switches (i.e., the optical switch unit 12 is a 1×4 optical switch), so that the control signal generator 26 generates four optical switch control signals 1 to 4 and outputs them to the optical switch unit 12.

Figure 6:
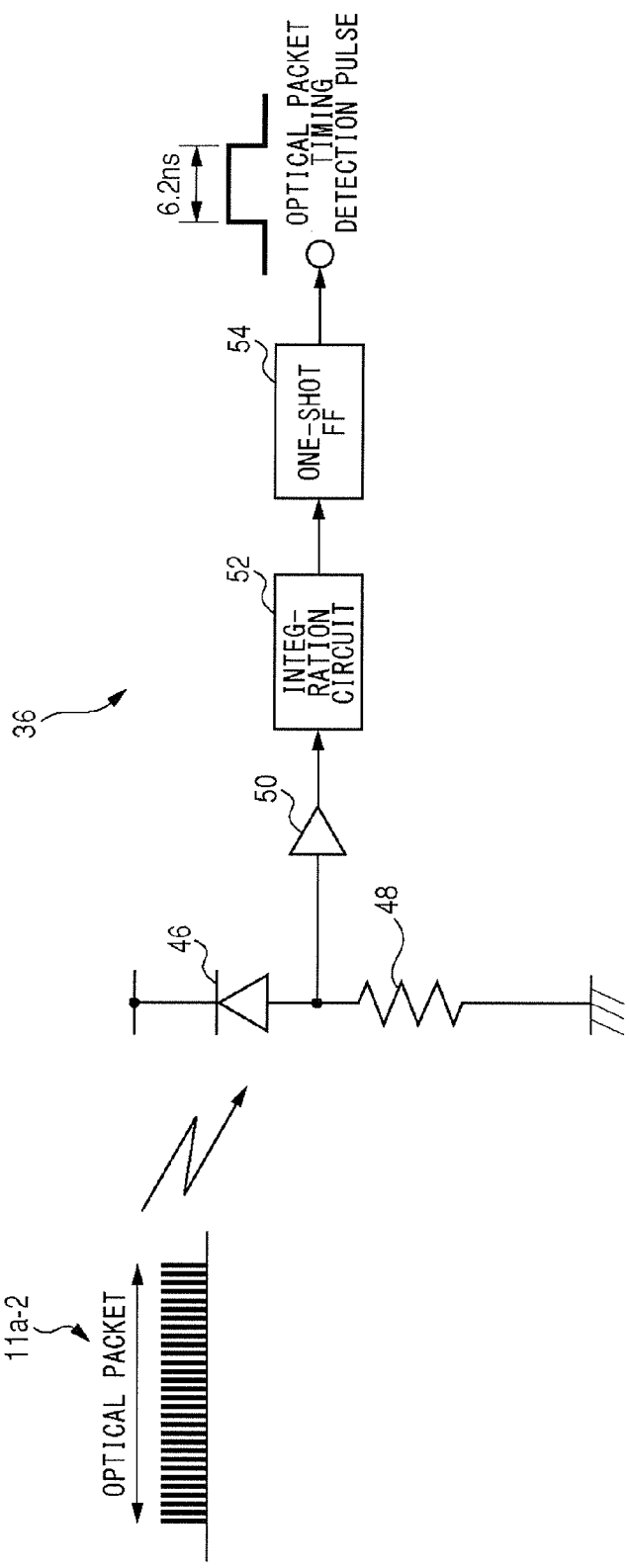
FIG. 6 shows a structure of an optical packet timing detection unit.
Figure 7:
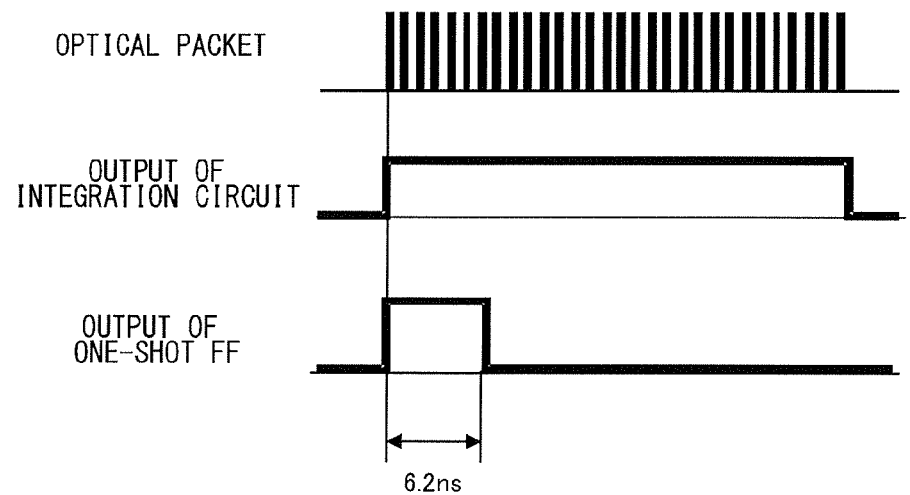
FIG. 7 shows an operation of an optical packet timing detection unit.

An optical packet signal 11*a*-2, which is the other of the signals bifurcated by the optical coupler 35, is inputted to the optical packet timing detection unit 36. FIG. 6 shows a structure of the optical packet timing detection unit 36. FIG. 7 shows an operation of the optical packet timing detection unit 36.

As shown in FIG. 6, the optical packet timing detection unit 36 includes a pin photo diode 46, a load resistor 48, an amplifier 50, an integration circuit 52, and a one-shot flip-flop (FF) 54.

The optical packet signal 11*a*-2 is converted into an electrical signal by the pin photo diode 46. This electrical signal is converted into a voltage signal in the load resistor 48 and is then amplified by the amplifier 50. The optical packet signal amplified by the amplifier 50 is integrated by the integration circuit 52 so as to form a rising edge of the optical packet signal. This integral signal drives the one-shot flip-flop 54 so as to generate a one-shot pulse. The pulse width of the one-shot pulse is 6.2 ns if the oscillation frequency of the local oscillator 28 is 161 MHz (cycle T=6.2 ns). This one-shot pulse is called an "optical packet timing detection pulse". The optical packet timing detection pulse serves as a phase reference for the optical packet when the optical packet signal and the local clock are compared by the phase comparator 38 (described later). The optical packet timing detection pulse generated by the optical packet timing detection unit 36 is inputted to the phase comparator 38.

Local clocks L-CLK1 to L-CLKN (N being an integer greater than or equal to 2) of different phases are also inputted to the phase comparator 38. The local clocks L-CLK1 to L-CLKN are generated by a local clock generating unit 43 which is comprised of the local oscillator 28, the distribution unit 40, and N clock delay units 42-1 to 42-N. In the local clock generating unit 43, the local clock L-CLK of 161 MHz generated by the local oscillator 28 is distributed to each of the clock delay units 42-1 to 42-N by the distribution unit 40. The first delay unit 42-1 supplies the first local clock L-CLK1, where the phase of local clock CLK is lagged by a predetermined delay time Nτ, to the phase comparator 38. Similarly, the second delay unit 42-2 supplies the second local clock L-CLK2, where the phase of local clock CLK is lagged by a predetermined delay time 2τ, to the phase comparator 38. The third delay unit 42-3 supplies the second local clock L-CLK2, where the phase of local clock CLK is lagged by a predetermined delay time 3τ, to the phase comparator 38. The Nth delay unit 42-N supplies the Nth local clock L-CLKN, where the phase of local clock CLK is lagged by a predetermined delay time Nτ, to the phase comparator 38. In this manner, N local clocks L-CLK1 to L-CLKN of different phases are inputted to the phase comparator 38. Also, the local clocks L-CLK1 to L-CLKN are also inputted to the selector unit 44.

Figure 8:
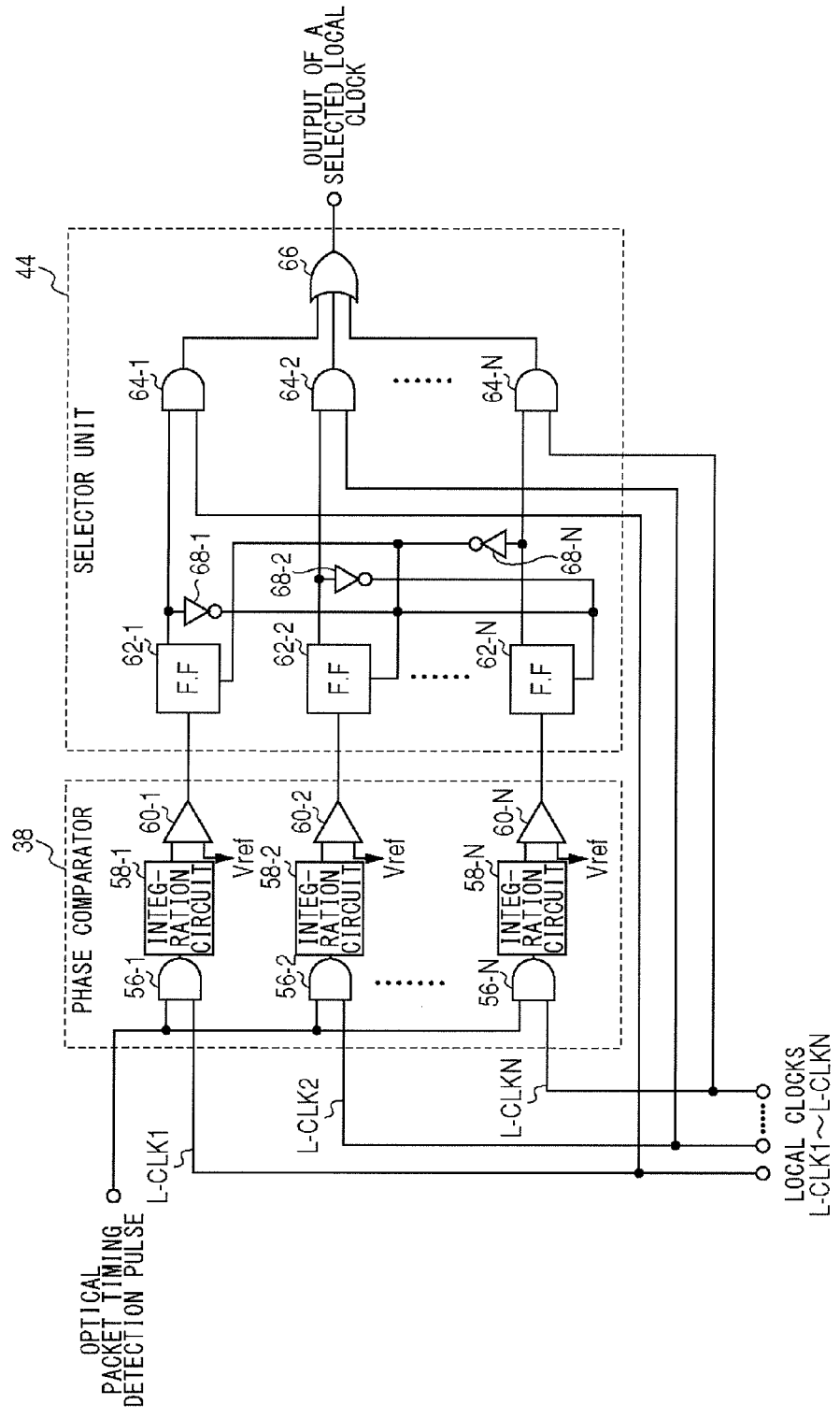
FIG. 8 shows structures of a phase comparator and a selector unit.

FIG. 8 shows structures of the phase comparator 38 and the selector unit 44. The phase comparator 38 compares a plurality of local clocks L-CLK1 to L-CLKN against the optical packet timing detection pulse generated by the optical packet timing detection unit 36. The selector unit 44 selects a local clock having the smallest phase difference with the optical packet timing detection pulse, and outputs the thus selected local clock to the frame synchronization unit 20, the clock transfer unit 22, the route decision unit 24 and the control signal generator 26.

As shown in FIG. 8, the phase comparator 38 includes N AND gates 56-1 to 56-N, N integration circuits 58-1 to 58-N, and N comparators 60-1 to 60-N. The optical packet timing detection pulse is inputted to one end of each of the AND gates 56-1 to 56-N from the optical packet timing detection unit 36. The local clocks L-CLK1 to L-CLKN are inputted to the other ends of the AND gates 56-1 to 56-N, respectively. The outputs of the AND gates 56-1 to 56-N are inputted to the integration circuits 58-1 to 58-N, respectively. The integral signal from each of the integration circuits 58-1 to 58-N is inputted to each of their respective comparators 60-1 to 60-N and then compared against a predetermined reference voltage Vref.

If each of the AND gates 56-1 to 56-N, respectively, computes the AND of the optical packet timing detection pulse having the pulse width of 6.2 ns and each of the local clocks L-CLK1 to L-CLKN, respectively, a pulse signal, having a pulse width that depends on how overlapped the phase of the optical packet timing detection pulse and the phase of the local clock are, will be outputted. More specifically, the higher the degree of overlapping between the phase of the optical packet timing detection pulse and the phase of the local clock is, namely the smaller the difference between them is, the wider the pulse width becomes. When this pulse signal is integrated by each of the integration circuits 58-1 to 58-N, the area of the pulse signal is converted into a voltage value. The smaller the phase difference between the optical packet timing detection pulse and the local clock, the higher the voltage value will be. Then each of the comparators 60-1 to 60-N compares each voltage value against the predetermined reference voltage Vref, and the pulse is outputted from only the comparator to which a voltage value higher than the reference voltage Vref has been inputted. The reference voltage Vref is set so that the pulse can be outputted from only the comparator to which the highest voltage value has been inputted.

The selector unit 44 includes N flip-flops 62-1 to 62-N whose respective clock terminals are connected to the comparators 60-1 to 60-N, respectively, N AND gates 64-1 to 64-N whose input terminals are connected to output terminals of the flip-flops 62-1 to 62-N, respectively, an OR gate 66 connected to output terminals of the AND gates 64-1 to 64-N. Also, inverters 68-1 to 68-N are connected to the output terminals of the flip-flops 62-1 to 62-N, respectively, whereas each of output terminals of the inverters 68-1 to 68-N is connected to clear terminals of the other flip-flops. Also, the local clocks L-CLK1 to L-CLKN from the clock delay units 42-1 to 42-N are inputted to the AND gates 64-1 to 64-N, respectively.

If, in the selector unit 44, for example, a pulse is inputted to the clock terminal of the first flip-flop 62-1 from the first comparator 60-1, "H" will be outputted from the output terminal of the first flip-flop 62-1 and then inputted to the first AND gate 64-1. The "H" output is converted to "L" by the first inverter and then inputted to the clear terminals of the other flip-flops 62-2 to 62-N and therefore "L" is outputted from the flip-flops 62-2 to 62-N. In the first AND gate 64-1, "H" is inputted and therefore the gate is open, so that first local clock L-CLK1 can pass the first AND gate. In the other AND gates 64-2 to 64-N, on the other hand, "L" is inputted, so that the second to Nth local clocks L-CLK2 to L-CLKN cannot pass the AND gates. The first local clock L-CLK1 having passed the first AND gate is outputted from the selector unit 44 via the OR gate 66. Though a description has been given of a case where the first local clock L-CLK1 is selected, any of the other local clocks may be selectable similarly.

As described above, the phase comparator 38 and the selector unit 44 are employed, so that a local clock having the smallest phase difference with the received optical packet signal can be selected. The selected local clock SL-CLK is inputted to the frame synchronization unit 20, the clock transfer unit 22, the route decision unit 24 and the control signal generator 26 where it is used as the operation clock. More specifically, the frame synchronization unit 20 establishes the frame synchronization using the selected local clock SL-CLK as the operation clock. Also, the clock transfer unit 22 performs a transfer from the clock to the selected local clock SL-CLK outputted by the selector unit 44. Thereby, the timing variations of switch control signals occurring at the frame synchronization unit 20 and the clock transfer unit 22 can be made smaller.

Referring back to FIG. 5, the optical packet signal bifurcated by the optical coupler 13 is inputted to the optical switch 12 via an optical delay unit 34. The delay time of the delay unit 34 is set in consideration of the time required for the generation of the optical switch control signal by the optical switch control unit 14.

The optical switch unit 12 is a 1×4 optical switch which has an optical coupler 30 for branching the inputted optical packet signal 11*b* off into four optical packet signals and four optical switches 32*a* to 32*d* for receiving the branched-off optical packet signals. The optical switches 32*a* to 32*d* may be implemented as ones employing a semiconductor optical amplifier (SOA) or an LN intensity modulator, for instance. The on/off of the optical switches 32*a* to 32*d* is controlled by the optical switch control signals 1 to 4. For example, when the optical packet signal 11*b* is to be outputted to route 1, the optical switch 32*a* is turned on, and the other optical switches 32*b* to 32*d* are turned off. As a result, the optical packet signal 11*b* is outputted to route 1, passing through the optical switch 32*a* only.

As described above, the optical packet switching apparatus 10 according to the present embodiment is configured such that a plurality of local clocks L-CLK1 to L-CLKN of different phases are prepared in advance and then a local clock having the smallest phase difference with the received optical packet is selected as the operation clock. Thereby, the timing variations of switch control signals at the frame synchronization unit 20 and the clock transfer unit 22 can be made smaller. As a result, the guard time between the optical packet signals can be shortened, so that the density of the optical packet signals can be raised and therefore the efficiency of the transmission path can be improved.

It is desirable that the number N of local clocks prepared in advance be as many as possible. The greater the number N of local clocks is, more probability there is of finding a local clock having a smaller phase difference with the optical packet signal. However, since the number of local clocks prepared is limited, the optimum number of local clocks may be set, as appropriate, according to the traffic volume and the like.

The present invention has been described based upon illustrative embodiments. The above-described embodiment is intended to be illustrative only and it will be obvious to those skilled in the art that various modifications to the combination of constituting elements and processes could be developed and that such modifications are also within the scope of the present invention.

What is claimed is:

1. An optical packet switching apparatus, comprising:
   an optical switch unit configured to switch a path of a received optical packet signal and output the received optical packet signal; and
   an optical switch control unit configured to extract destination information from the received optical packet and configured to generate a control signal for the optical switch unit according to the destination information,
   wherein the optical switch control unit includes a clock generator for generating a plurality of local clocks of different phases, and a clock selector for selecting a local clock having the smallest phase difference with the received optical packet from the plurality of local clocks, and
   the optical switch control unit generates the control signal using the local clock selected by the clock selector as an operation clock.

2. The optical packet switching apparatus according to claim 1, wherein the optical switch control unit further includes a frame synchronization unit for synchronizing frames of optical packet signals using the local clock selected by the clock selector as operation clock.

3. The optical packet switching apparatus according to claim 1, wherein the optical switch control unit further includes a clock transfer unit for performing a transfer from a clock of the received optical packet signal to the local clock selected by the clock selector.

4. The optical packet switching apparatus according to claim 1, wherein the optical switch control unit further includes an optical packet timing detector for generating an optical packet timing detection pulse that serves as a phase reference of the received optical packet signal, and
   wherein the clock selector selects a local clock having the smallest phase difference with the optical packet timing detection pulse.

\* \* \* \* \*